United States Patent Office 3,162,649
Patented Dec. 22, 1964

3,162,649
3,4-DICYANO-2,5-DIKETOPYRROLINE AND ITS
N-ALKYL DERIVATIVES
Edward G. Howard, Jr., Hockessin, Del., assignor to E. I.
du Pont de Nemours and Company, Wilmington, Del.,
a corporation of Delaware
No Drawing. Filed May 31, 1962, Ser. No. 198,713
6 Claims. (Cl. 260—326.5)

This invention has as its principal objects the provision of 3,4-dicyano-2,5-diketopyrroline, a convenient method for its preparation, and certain of its derivatives.

The 3,4-dicyano-2,5-diketopyrrolines of this invention correspond to the formula

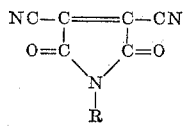

wherein R is hydrogen or lower alkyl, i.e., an alkyl group of one through seven carbons.

3,4-dicyano-2,5-diketopyrroline, the preferred product of this invention, is readily obtained by reacting tetracyanoethylene with fluorosulfuric acid ($FSO_3H$) and then hydrolyzing the resulting 3,4-dicyano-2-imino-5-ketopyrroline fluorosulfate. The reactions are as follows:

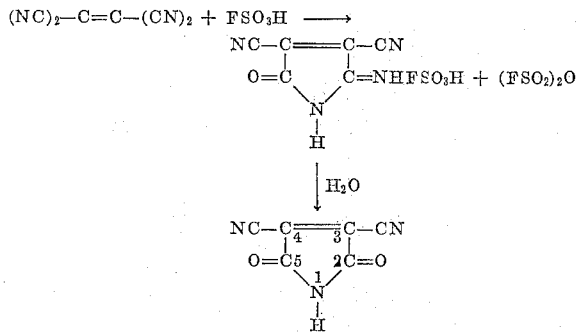

The tetracyanoethylene and fluorosulfuric acid are conveniently contacted at a temperature of 20°–30° C. If desired, temperatures lower than 20° C. or higher than 30° C. may be employed but offer no practical advantage.

In effecting the cyclization reaction, the fluorosulfuric acid is generally employed as a reactant and reaction medium. Conveniently from 3 to 10 moles of the fluorosulfuric acid per mole of tetracyanoethylene are employed, and after reaction is complete, the pyrosulfuryl fluoride formed in the reaction removed by vacuum distillation. The excess acid is removed by trituration with ether. The 3,4-dicyano-2-imino-5-ketopyrroline fluorosulfate which remains as a residue, when exposed to moist air, is hydrolyzed to the desired 3,4-dicyano-2-,5-diketopyrroline.

Usually the reaction between the tetracyanoethylene and fluorosulfuric acid is conducted at ambient pressure. If desired, superpressures can be used, but this has no practical advantage and does lead to complications in equipment design.

In a typical method for preparing 3,4-dicyano-2,5-diketopyrroline, tetracyanoethylene is added at 20° to 30° C. to the fluorosulfuric acid with stirring. The mixture is permitted to react for from 5 to 100 hours, and then subjected to distillation, under reduced pressure, to remove the pyrosulfuryl fluoride formed. The residue is triturated with diethyl ether, and the product is hydrolized by exposing it to moist air at room temperature. The hydrolyzed product thus obtained is extracted, e.g., with benzene in a Soxhlet extractor, until the benzene extract is colorless. The product, 3,4-dicyano-2,5-diketopyrroline, forms as crystals when the benzene solution is cooled.

Tetracyanoethylene, $(NC)_2C=C(CN)_2$, can be prepared by the reaction of sulfur monochloride with malononitrile under anhydrous conditions, as disclosed by Cairns et al., J. Am. Chem. Soc., 80 2775 (1958).

The alkyl substituted 3,4-dicyano-2,5-diketopyrrolines are obtained by a two-step method which consists in first converting the 3,4-dicyano-2,5-diketopyrroline to a metallic salt, e.g., a silver salt as by reaction with silver oxide, and then reacting the metal salt with an alkyl halide, e.g., methyl iodide, as illustrated in Example III.

The following two examples are submitted to illustrate the preparation of 3,4-dicyano-2,5-diketopyrroline.

EXAMPLE I

When 60 g. (0.48 mole) of $(NC)_2C=C(CN)_2$ was added to 200 g. (2 moles) of $HSO_3F$ at 25° C., a slight exothermic reaction occurred. The reaction mixture was stirred and kept in a water bath for 18 hours. At this time a layer of pyrosulfuryl fluoride had formed and the $FSO_3H$ solution had become viscous. The $(FSO_2)_2$ was removed by vacuum evaporation and the residue was triturated with absolute ether to give a gray crystalline product. This product was hydrolyzed by exposing it to air for one day. The resulting brown solid was pulverized, mixed with 25 g. of diatomaceous earth, and the mixture was then extracted with hot benzene by means of a Soxhlet extractor until the benzene was colorless. On cooling, 32 g. of 3,4-dicyano-2,5-diketopyrroline was obtained, M.P. 175–177° C. An additional 3 g. was obtained by evaporation of the solvent, yield 56%.

EXAMPLE II

A mixture consisting of 30 g. (0.23 mole) of tetracyanoethylene and 100 g. of fluorosulfuric acid, $FSO_3H$, was stirred together for four days at room temperature. The mixture developed two layers, one was viscous and the other was mobile and water white. The latter layer was removed by vacuum evaporation and proved to be pyrosulfuryl fluoride (B.P. 50° C., 35 g., 0.193 mole). The viscous residue was stirred with absolute ether to give 55 g. of a gray crystalline solid. This material was hydroscopic and was found by analysis to contain bound ether.

Analysis.—Calcd. for

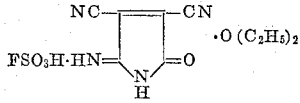

C, 37.49%; H, 4.10%; N, 17.49%; S, 10.02%; F, 5.92%.
Found: C, 36.89%; H, 4.00%; N, 18.45%; S, 10.06%; F, 4.72%. IR: 4.5µ, conjugated nitrile; 3.1µ, NH; 5.75µ, lactam carbonyl; 8–10µ, S—O.

Storage in a glass vessel containing moist air caused etching of the glass. Extraction with hot xylene and vacuum evaporation of the solvent gave a very pale yellow solid, 3,4-dicyano-2,5-diketopyrroline, when dried at 25° C. under 0.5 mm. pressure.

Analysis.—Calcd. for

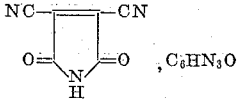

C, 49.05%; H, 0.69%; N, 28.61%; F, 0%; S, 0%.
Found: C, 49.41%; H, 1.32%; N, 27.17%; F, 0%; S, 0%.
IR: 3.06µ for N—H; 6.56, C=C, 4.5µ conjugated CN; 5.75µ, C=O.

An aliquot portion of the 3,4-dicyano-2,5-diketopyrroline, prepared as above, was extracted with benzene in a Soxhlet extractor and the benzene then removed by evaporation. The solid was taken up in benzene, recrystallized therefrom, and dried at 55° C./0.3 mm. pressure. The product thus obtained had a melting point of 173–174° C.

*Analysis.*—Calcd. for $C_6HN_3O$: C, 49.05%; H, 0.69%; N, 28.61%; M.W., 147. Found: C, 48.78%; H, 1.08%; N, 29.29%; M.W., 149.5 pK$_a$ (at 0° C.) 3.25.

As evidenced by the pK$_a$ value given above, 3,4-dicyano-2,5-diketopyrroline is a strong acid; and therefore, it readily forms salts. For example, a silver salt can readily be formed by reaction with silver oxide. The silver salt can in turn be converted by conventional techniques to 1-alkyl derivatives of 3,4-dicyano-2,5-diketopyrroline. This is illustrated by the following example.

EXAMPLE III

A. To a stirred solution of 5.9 g. (0.04 mole) of 3,4-dicyano-2,5-diketopyrroline, prepared as above, in 30 ml. of dry acetonitrile there was added at 0° C. 8.8 g. (0.022 mole) of silver oxide, $Ag_2O$. The solution became immediately bright yellow in color. After stirring for five minutes, anhydrous magnesium sulfate was added to remove water formed in the reaction. The mixture was stirred for one hour at 0° C., filtered, and the filtrate divided into two portions as follows:

To the first portion (about ¼ of the product) there was added diethyl ether, which caused precipitation of 3 g. of a bright yellow solid. This solid was redissolved and the solution filtered to remove a small amount of solid which had formed. The silver salt was reprecipitated by adding the solution to diethyl ether, the solid which formed was separated by filtration, and dried at 25° C. under 0.5 mm. pressure.

A piece of filter paper was impregnated with a solution of the silver salt, prepared as above, in acetonitrile, and the impregnated paper, after drying, was touched with a hot stylus. A dark brown spot was made which indicated that the silver salt was thermographic. The product analyzed:

Calcd. for $C_6N_3O_2Ag$: N, 16.5%; Ag, 42.5%. Found: N, 16.1%; Ag, 42.1%.

B. To the second portion (which amounted to ¾ of the product) was added 7 g. of methyl iodide, the mixture was allowed to stand at 25° C. for one hour and then warmed to 50° C. The mixture was allowed to cool and after one hour it was filtered into ether. The solid which was separated was removed by filtration and the filtrate evaporated to dryness under vacuum. There remained 2.5 g. of a sticky solid. A portion was recrystallized from benzene. The solid thus obtained melted at 145°–165° C. An aliquot portion of the solid was recrystallized from carbon tetrachloride, and the thus purified solid, 1-methyl-3,4-dicyano-2,5-diketopyrroline, melted at 162°–166° C., and analyzed:

Calcd. for $C_7H_3N_3O_2$: C, 52.19%; H, 1.8%; N, 26.08%. Found: C, 51.48%; H, 2.20%; N, 25.00%.

When, for example, ethyl, propyl, tert.-butyl, pentyl, hexyl, or heptyl iodide are substituted for methyl iodide in Example III–B, the corresponding 1-ethyl, 1-propyl, 1-tert.-butyl, 1-pentyl, 1-hexyl or 1-heptyl-3,4-dicyano-2,5-diketopyrroline is obtained.

3,4-dicyano-2,5-diketopyrroline and the 1-alkyl-3,4-dicyano-2,5-diketopyrrolines of this invention are capable of entering into Diels-Alder type of condensation reactions to give colored polycyclic compounds which possess interesting structures and are useful for dyeing paper, fabrics, etc. These condensations are illustrated below:

*Example A*

To a solution of 0.29 g. (0.002 mole) of 3,4-dicyano-2,5-diketopyrroline in 125 ml. of benzene was added 0.36 g. (0.002 mole) of anthracene. The mixture became blue in color and a solid precipitated. After standing three days, 0.64 g. of colorless solid was collected. A sample was recrystallized from acetone and dried at 55° C. under 0.5 mm. and found to have held a molecule of acetone. The product, $C_{20}H_{11}N_3O_2 \cdot CH_3COCH_3$, analyzed: Calcd. for $C_{20}H_{11}N_3O_2 \cdot CH_3COCH_3$: C, 72.06%; H, 4.47%; N, 10.96%. Found: C, 71.73%; H, 4.45%; N, 10.90%.

*Example B*

When 0.27 g. (0.002 mole) of p-methoxystyrene was added to 0.29 g. (0.002 mole) 3,4-dicyano-2,5-diketopyrroline, a deep blue color formed, which quickly faded, and considerable heat was evolved. The mixture was taken up in 7 ml. of dry acetonitrile and 0.1 g. more of the substituted styrene was added. After standing for one day at 25° C., the product was isolated by removing the small amount of polymer by filtration and distilling off the solvent under reduced pressure. The remaining colorless solid (0.51 g.) was recrystallized from ethylene chloride, M.P. 213–214° C.

*Analysis.*—Calcd. for $C_{15}H_{11}N_3O_3$: C, 64.04%; H, 3.95%; N, 14.94%. Found: C, 63.46%; H, 3.71%; N, 14.80%. Infrared spectrum had absorption bands at 3.12μ (N-H), 4.44μ (CN), 5.55μ and 5.75μ (imide carbonyl).

Reaction of 3,4-dicyano-2,5-diketopyrroline with N,N-dimethylaniline produces a purple dyestuff, which is useful in dyeing paper, fabrics, and the like. The preparation of this dyestuff is illustrated below.

*Example C*

A 0.29 g. sample of 2,5-dicyano-3,4-diketopyrroline was added to 5 ml. of N,N-dimethylaniline at ambient temperature, the mixture was allowed to stand for three days, and the purple-colored solid which separated was then collected by filtration. The purple solid was soluble in acetic acid and analyzed—Calcd. for $$C_{14}H_{12}N_4O_2 \cdot \tfrac{1}{2}H_2O$$

C, 60.7%; H, 4.70%; N, 20.1%. Found: C, 60.78%; H, 4.82%; N, 20.03%.

The solution of the $C_{14}H_{12}N_4O_2 \cdot \tfrac{1}{2}H_2O$ compound in acetic acid was applied to paper and after drying the paper was found to have been dyed a purple color. Thus, the compound is useful as a dyestuff. Similarly good dyeings are obtained using cloth instead of paper.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

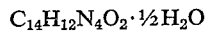

$$\begin{array}{c} NC-C=\!\!=\!\!C-CN \\ | \quad\quad\quad | \\ O=C \quad\quad C=O \\ \diagdown\;N\;\diagup \\ | \\ R \end{array}$$

wherein R is a member selected from the group consisting of hydrogen and lower alkyl.

2. 3,4-dicyano-2,5-diketopyrroline.

3. 1-methyl-3,4-dicyano-2,5-diketopyrroline.

4. A process of preparing 3,4-dicyano-2,5-diketopyrroline consisting in contacting and reacting tetracyanoethylene with excess fluorosulfuric acid and then hydrolyzing the resultant product.

5. Process of claim 4 wherein tetracyanoethylene and fluorosulfuric acid are contacted at a temperature of 20°–30° C.

6. The silver salt of 3,4-dicyano-2,5-diketopyrroline.

No references cited.